US012734901B2

(12) United States Patent
Kudo

(10) Patent No.: US 12,734,901 B2
(45) Date of Patent: Sep. 15, 2026

(54) DRIVER ASSISTANCE APPARATUS FOR ELECTRIC VEHICLE

(71) Applicant: SUBARU CORPORATION, Tokyo (JP)

(72) Inventor: Shinya Kudo, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 52 days.

(21) Appl. No.: 18/895,655

(22) Filed: Sep. 25, 2024

(65) Prior Publication Data

US 2025/0108700 A1 Apr. 3, 2025

(30) Foreign Application Priority Data

Oct. 3, 2023 (JP) ................................ 2023-172118

(51) Int. Cl.
*B60L 15/20* (2006.01)
*B60L 7/10* (2006.01)
*B60L 58/12* (2019.01)

(52) U.S. Cl.
CPC ................ *B60L 15/20* (2013.01); *B60L 7/10* (2013.01); *B60L 58/12* (2019.02); *B60L 2240/12* (2013.01)

(58) Field of Classification Search
CPC .. B60L 15/20; B60L 7/10; B60L 58/12; B60L 2240/12; B60L 7/18
See application file for complete search history.

(56) References Cited

U.S. PATENT DOCUMENTS

2016/0375775 A1* 12/2016 Imanishi .................. B60L 7/10
701/70
2018/0154777 A1* 6/2018 Hall ......................... B60L 7/18
2019/0241188 A1* 8/2019 Tsuchiya ............... B60W 30/12
2025/0091576 A1* 3/2025 Hwang ..................... B60L 3/12

FOREIGN PATENT DOCUMENTS

JP 2011-091935 A 5/2011

OTHER PUBLICATIONS

Li, Y., Cheng, H., Zeng, Z., Deml, B., & Liu, H. (2023). An AV-MV negotiation method based on synchronous prompt information on a multi-vehicle bottleneck road. Transportation research interdisciplinary perspectives, 20, 100845. (Year: 2023).*

* cited by examiner

*Primary Examiner* — Stephanie T Su
(74) *Attorney, Agent, or Firm* — SoraIP, Inc.

(57) ABSTRACT

A driver assistance apparatus for an electric vehicle includes a battery, a motor generator, a vehicle speed sensor, a travel environment data obtainer, and a processing circuit. The processing circuit is configured to control a vehicle speed and a deceleration rate of the electric vehicle, based on the vehicle speed detected by the vehicle speed sensor and travel environment data acquired by the travel environment data obtainer, by causing the motor generator to be driven and perform regenerative braking. The processing circuit includes: a road detector configured to perform a detection of a wide street and a narrow street, based on the travel environment data; a stop position detector configured to perform a detection of a stop position, based on the travel environment data; and a deceleration processor configured to decelerate the electric vehicle by the regenerative braking at a low deceleration rate in traveling on the wide street.

6 Claims, 8 Drawing Sheets

DRIVER ASSISTANCE APPARATUS FOR ELECTRIC VEHICLE

CROSS-REFERENCE TO RELATED APPLICATIONS

The present application claims priority from Japanese Patent Application No. 2023-172118 filed on Oct. 3, 2023, the entire contents of which are hereby incorporated by reference.

BACKGROUND

Technical Field

The disclosure relates to a driver assistance apparatus for an electric vehicle.

Related Art

There have been known electric vehicles such as a battery electric vehicle (BEV) or a range extender electric vehicle (a range extender EV). The BEV includes an electric motor that serves as a drive source and is driven by electric power stored in a battery of the BEV. The range extender EV includes an engine dedicated to electric power generation.

Some of these electric vehicles further include a driver assistance apparatus that executes automated driving control or adaptive cruise control (ACC). Control of traveling of the electric vehicle by the driver assistance apparatus alleviates a burden on a driving operation to be performed by a driver who drives the electric vehicle.

When driven by a courier or the driver in commuting, the electric vehicle often travels on community roads in a residential area. Many of the community roads have intersections without traffic lights, and many of the intersections have poor corner visibility because of hedges or outer walls of houses located at the corners of the intersections. Further, many of the community roads are narrow streets having narrow-width part in the middle thereof where vehicles have difficulties in passing each other. In attempting to enter an intersection leading to a priority road from such a narrow street, it is necessary for the electric vehicle to stop before the intersection.

Accordingly, traveling of the electric vehicle on the community road under the control of the driver assistance apparatus involves frequent control of repeatedly decelerating and accelerating the electric vehicle. When decelerating the electric vehicle, the driver assistance apparatus causes the electric motor to operate as an electric power generator that performs a regenerative operation, convert deceleration energy into regenerative electric power, and charge the battery with the regenerative electric power.

The electric vehicle consumes a larger amount of the electric power of the battery when being started. Accordingly, when the battery has a low state of charge (SOC), it is necessary to efficiently convert the deceleration energy into the regenerative electric power while the electric vehicle is decelerated before being stopped.

For example, Japanese Unexamined Patent Application Publication (JP-A) No. 2011-91935 discloses a technique of permitting rapid deceleration by regenerative braking to actively charge a battery of an electric vehicle when a SOC of the battery is less than or equal to a threshold.

SUMMARY

An aspect of the disclosure provides a driver assistance apparatus for an electric vehicle. The driver assistance apparatus includes a battery, a motor generator, a vehicle speed sensor, a travel environment data obtainer, and a processing circuit. The motor generator is configured to drive the electric vehicle with electric power supplied from the battery and charge the battery with electric power generated by regenerative braking upon decelerating the electric vehicle. The vehicle speed sensor is configured to detect a vehicle speed of the electric vehicle. The travel environment data obtainer is configured to acquire travel environment data on a travel environment ahead of the electric vehicle. The processing circuit is configured to control the vehicle speed and a deceleration rate of the electric vehicle, based on the vehicle speed detected by the vehicle speed sensor and the travel environment data acquired by the travel environment data obtainer, by causing the motor generator to be driven and perform the regenerative braking. The processing circuit includes a road detector, a stop position detector, and a deceleration processor. The road detector is configured to perform a detection of a wide street and a narrow street, based on the travel environment data acquired by the travel environment data obtainer. The wide street leads to the narrow street. The stop position detector is configured to perform a detection of a stop position, based on the travel environment data acquired by the travel environment data obtainer. The stop position is located down the narrow street detected by the road detector. The deceleration processor is configured to decelerate the electric vehicle by the regenerative braking at a low deceleration rate in traveling on the wide street prior to entering the narrow street, upon the detection of the narrow street by the road detector and the detection of the stop position by the stop position detector.

An aspect of the disclosure provides a driver assistance apparatus for an electric vehicle. The driver assistance apparatus includes a battery, a motor generator, a vehicle speed sensor, and circuitry. The motor generator is configured to drive the electric vehicle with electric power supplied from the battery and charge the battery with electric power generated by regenerative braking upon decelerating the electric vehicle. The vehicle speed sensor is configured to detect a vehicle speed of the electric vehicle. The circuitry is configured to acquire travel environment data on a travel environment ahead of the electric vehicle. The circuitry is configured to control the vehicle speed and a deceleration rate of the electric vehicle, based on the vehicle speed detected by the vehicle speed sensor and the travel environment data, by causing the motor generator to be driven and perform the regenerative braking. The circuitry is configured to perform a detection of a wide street and a narrow street, based on the travel environment data. The wide street leads to the narrow street. The circuitry is configured to perform a detection of a stop position, based on the travel environment data. The stop position is located down the narrow street. The circuitry is configured to decelerate the electric vehicle by the regenerative braking at a low deceleration rate in traveling on the wide street prior to entering the narrow street, upon the detection of the narrow street and the detection of the stop position.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 8:
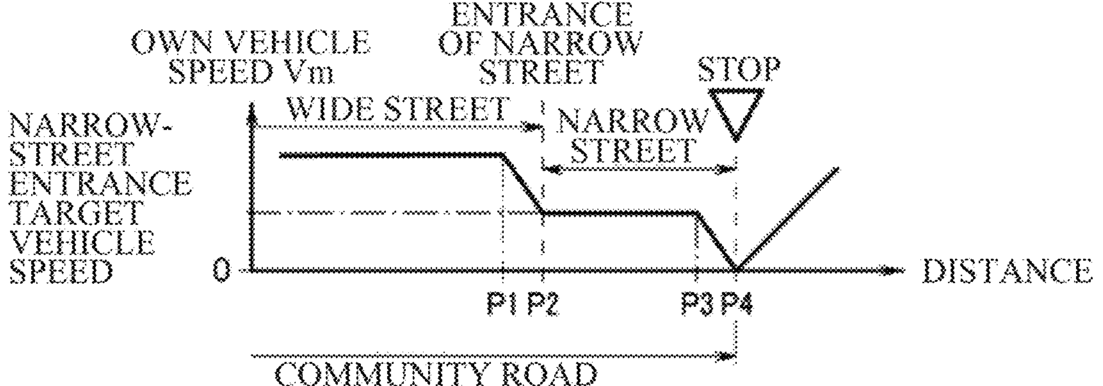
FIG. 8 is an explanatory diagram illustrating a typical vehicle speed control state of the electric vehicle illustrated in FIG. 1 in traveling from the wide street to the narrow street of the community road.

An electric vehicle traveling on a community road is controlled by a driver assistance apparatus to travel at a low speed. For example, as illustrated in FIG. 8, the electric vehicle is to travel on a community road having a wide street where vehicles are able to pass each other, a narrow street located ahead of the wide street, and a stop line indicating a stop position located down the narrow street.

In traveling on such a community road, the driver assistance apparatus first sets a target vehicle speed of the electric vehicle for the travel on the narrow street. Thereafter, the driver assistance apparatus sets a deceleration starting point P1, based on a difference between the target vehicle speed and a current vehicle speed of the electric vehicle, in order to decelerate the current vehicle speed to the target vehicle speed at an entrance of the narrow street. When the electric vehicle has reached the deceleration starting point P1, the driver assistance apparatus starts to decelerate the electric vehicle.

When the electric vehicle has reached the entrance of the narrow street (i.e., a constant-speed starting point P2), that is, when the electric vehicle has been decelerated to the target vehicle speed, the driver assistance apparatus causes the electric vehicle to travel on the narrow street at the target vehicle speed set as the vehicle speed of the electric vehicle. Thereafter, when detecting the stop line where the electric vehicle is to be stopped, the driver assistance apparatus sets a deceleration starting point (hereinafter, also referred to as a constant-speed end point) P3, in order to stop the electric vehicle at the stop line (i.e., the vehicle speed=0 km/h). When the electric vehicle has reached the deceleration starting point P3, the driver assistance apparatus starts to decelerate the electric vehicle and stops the electric vehicle at a target stop point P4 set before the stop line.

If rapid deceleration by regenerative braking is permitted by the driver assistance apparatus as disclosed in JP-A No. 2011-91935 in such a situation where the electric vehicle is traveling in a low-speed environment such as the community road with a low state of charge (SOC) of the battery, the following concerns arise.

(1) In traveling at a low speed, rapid deceleration caused by a large gradient of the vehicle speed in each of a deceleration zone between the deceleration starting point P1 and the constant-speed starting point P2 and a deceleration zone between the deceleration starting point P3 and the target stop point P4 illustrated in FIG. 8 gives a driver who drives the electric vehicle strangeness.

(2) The rapid deceleration in the traveling at a low speed shortens a time period in which regenerative energy is chargeable, which rather deteriorates charging efficiency.

(3) The electric vehicle having been subjected to the rapid deceleration before the stop line is difficult to stop at the stop line by the regenerative braking, resulting in a higher distribution ratio of friction braking to the regenerative braking. This further deteriorates the charging efficiency. When the electric vehicle is a range extender electric vehicle (a range extender EV), frequency of starting up an engine dedicated to electric power generation increases with the decrease in the charging efficiency, which deteriorates fuel economy.

It is desirable to provide a driver assistance apparatus for an electric vehicle that allows improvement in charging efficiency in decelerating the electric vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 1:
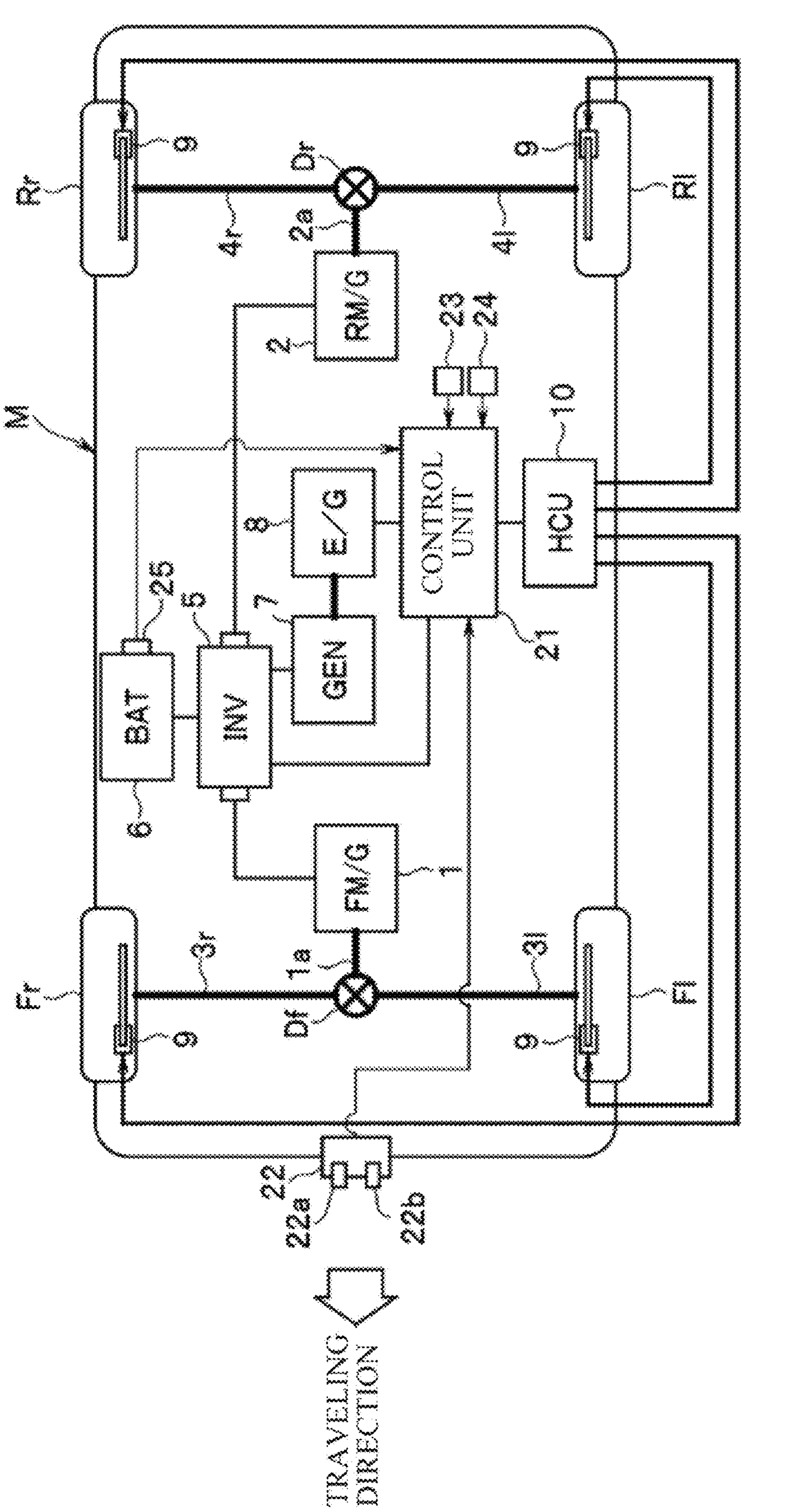
FIG. 1 is a block diagram illustrating a schematic configuration of an electric vehicle to which a driver assistance apparatus according to one example embodiment of the disclosure is applied.

FIG. 1 illustrates an electric vehicle M (hereinafter, also referred to as an "own vehicle"). The electric vehicle M illustrated in FIG. 1 may be a four-wheel-drive range extender EV including a range extender.

The electric vehicle M includes a front motor generator (FM/G) 1 and a rear motor generator (RM/G) 2 as power sources. The FM/G 1 may have an output shaft **1*a* coupled to a drive shaft 3*l* of a front drive wheel Fl and a drive shaft 3*r* of a front drive wheel Fr via a front differential Df. The RM/G 2 may have an output shaft 2*a* coupled to a drive shaft 4*l* of a rear drive wheel Rl and a drive shaft 4*r* of a rear drive wheel Rr via a rear differential Dr. In one embodiment, the FM/G 1 and the RM/G 2** may each serve as a "motor generator".

The FM/G 1 and the RM/G 2 may be each coupled to a battery 6 via an inverter 5. The inverter 5 may convert direct-current electric power received from the battery 6 into alternating-current electric power and supply the alternating-current electric power to each of the FM/G 1 and the RM/G 2. The FM/G 1 and the RM/G 2 may respectively drive the front drive wheels Fl and Fr and the rear drive wheels Rl and Rr by the alternating-current electric power supplied from the inverter 5 to thereby perform power running of the electric vehicle M.

When the electric vehicle M is traveling while decelerating, the inverter 5 may cause the FM/G 1 and the RM/G 2 to operate as electric power generators that perform a regenerative operation, convert alternating-current regenerative electric power generated in the regenerative operation into direct-current electric power, and supply the direct-current electric power to the battery 6. Operating the FM/G 1 as the electric power generator may apply a regenerative braking force to each of the front drive wheels Fl and Fr. Likewise, operating the RM/G 2 as the electric power generator may apply a regenerative braking force to each of the rear drive wheels RI and Rr.

The electric vehicle M may further include: an electric power generator (GEN) 7 serving as a component of the range extender; and an engine dedicated to electric power generation (hereinafter, simply referred to as an "engine") 8.

The GEN 7 may be coupled to the battery 6 via the inverter 5. When being rotationally driven by the engine 8, the GEN 7 may output generated alternating-current electric power. The alternating-current electric power outputted from the GEN 7 may be converted by the inverter 5 into direct-current electric power, and the direct-current electric power may be supplied from the inverter 5 to the battery 6. The engine 8 may cause the GEN 7 to generate electric power that compensates electric power consumption of the battery 6.

The front drive wheels Fl and Fr and the rear drive wheels RI and Rr may each include a hydraulic brake mechanism 9. In the present example embodiment, each hydraulic brake mechanism 9 may be any known friction brake device such as a disc brake or a drum brake. Each hydraulic brake mechanism 9 may produce a hydraulic braking force (i.e., a friction braking force) by operating a piston of a wheel cylinder by brake fluid pressure supplied from a hydraulic control unit (HCU) 10.

The HCU 10 may include a hydraulic pressure generator, a pressure regulation control valve, and an actuator or a valve. The hydraulic pressure generator may include components such as a booster pump or an accumulator. The pressure regulation control valve may regulate the brake fluid pressure to be applied at the time of braking and supply the regulated brake fluid pressure to the wheel cylinder of each hydraulic brake mechanism 9. Non-limiting examples of the actuator or the valve may include an on/off valve that opens and closes a hydraulic circuit that supplies the brake fluid pressure to each hydraulic brake mechanism 9.

The inverter 5, the engine 8, and the HCU 10 described above may each operate in response to a control signal received from a control unit 21. The control unit 21 may include a microcontroller including: a central processing unit (CPU); a random-access memory (RAM); a read-only memory (ROM); a rewritable nonvolatile memory such as a flash memory or an electrically erasable programmable read-only memory (EEPROM); and a peripheral device. The ROM may hold data such as a program or fixed data usable for executing processing of the CPU. The RAM may serve as a work area of the CPU and temporarily hold various kinds of data of the CPU. Note that the CPU may also be referred to a microprocessor unit (MPU) or a processor. In some embodiments, the CPU may be replaced by a graphics processing unit (GPU) or a graph streaming processor (GSP). In some embodiments, the CPU, the GPU, and the GSP may be selectively combined for use. In one embodiment, the control unit 21 may serve as a "processing circuit".

To an input side of the control unit 21, a camera unit 22, a map locator unit 23, a vehicle speed sensor 24 that detects a vehicle speed, and a SOC sensor 25 that detects a state of charge (SOC) of the battery 6 may be coupled. In one embodiment, the SOC sensor 25 may serve as a "state-of-charge sensor".

The camera unit 22 may be disposed in the front of the electric vehicle M. The camera unit 22 may include a stereo camera including a main camera **22*a* and a sub-camera 22*b*. The camera unit 22 may include an image processor. The image processor may perform image processing on images of a travel environment ahead of the electric vehicle M captured by the two cameras, i.e., the main camera 22*a* and the sub-camera 22*b***, to thereby acquire travel environment data.

The map locator unit 23 may include a global navigation satellite system (GNSS) sensor and a road map database. The GNSS sensor may receive respective positioning signals transmitted from multiple positioning satellites to thereby acquire position coordinates of the electric vehicle M (i.e., own vehicle position data). The road map database may hold road map data. The map locator unit 23 may perform map matching of the own vehicle position data acquired by the GNSS sensor to a road map in the road map database to thereby estimate a current position of the electric vehicle M (i.e., an own vehicle position) on the road map. In one embodiment, the camera unit 22 and the map locator unit 23 may serve as a "travel environment data obtainer".

The vehicle speed sensor 24 may detect a vehicle speed Vm of the electric vehicle M (i.e., an own vehicle speed Vm), based on data such as a rotation speed of the output shaft **1*a* of the FM/G 1 or a rotation speed of the output shaft 2*a* of the RM/G 2. The SOC sensor 25 may detect a voltage value and a current value of the battery 6 to thereby detect the SOC of the battery 6 (hereinafter, also referred to as a "battery SOC"). In some embodiments, the SOC may be expressed as a charge rate indicating a dischargeable capacity of the battery 6**. The charge rate may be calculated as follows.

$$\text{Charge rate}=[\text{remaining capacity (Ah)}/\text{full charge capacity (Ah)}]\cdot 100(\%)$$

For example, a charge rate of 100% may indicate a fully charged state, and a charge rate of 0% may indicate a completely discharged state.

The control unit 21 may determine whether the electric vehicle M is traveling on the community road. If determining that the electric vehicle M is traveling on the community road, the control unit 21 may control the own vehicle speed Vm in traveling of the electric vehicle M under automated driving control or adaptive cruise control (ACC), in accordance with a condition of the community road and the SOC of the battery 6.

Figure 2A:
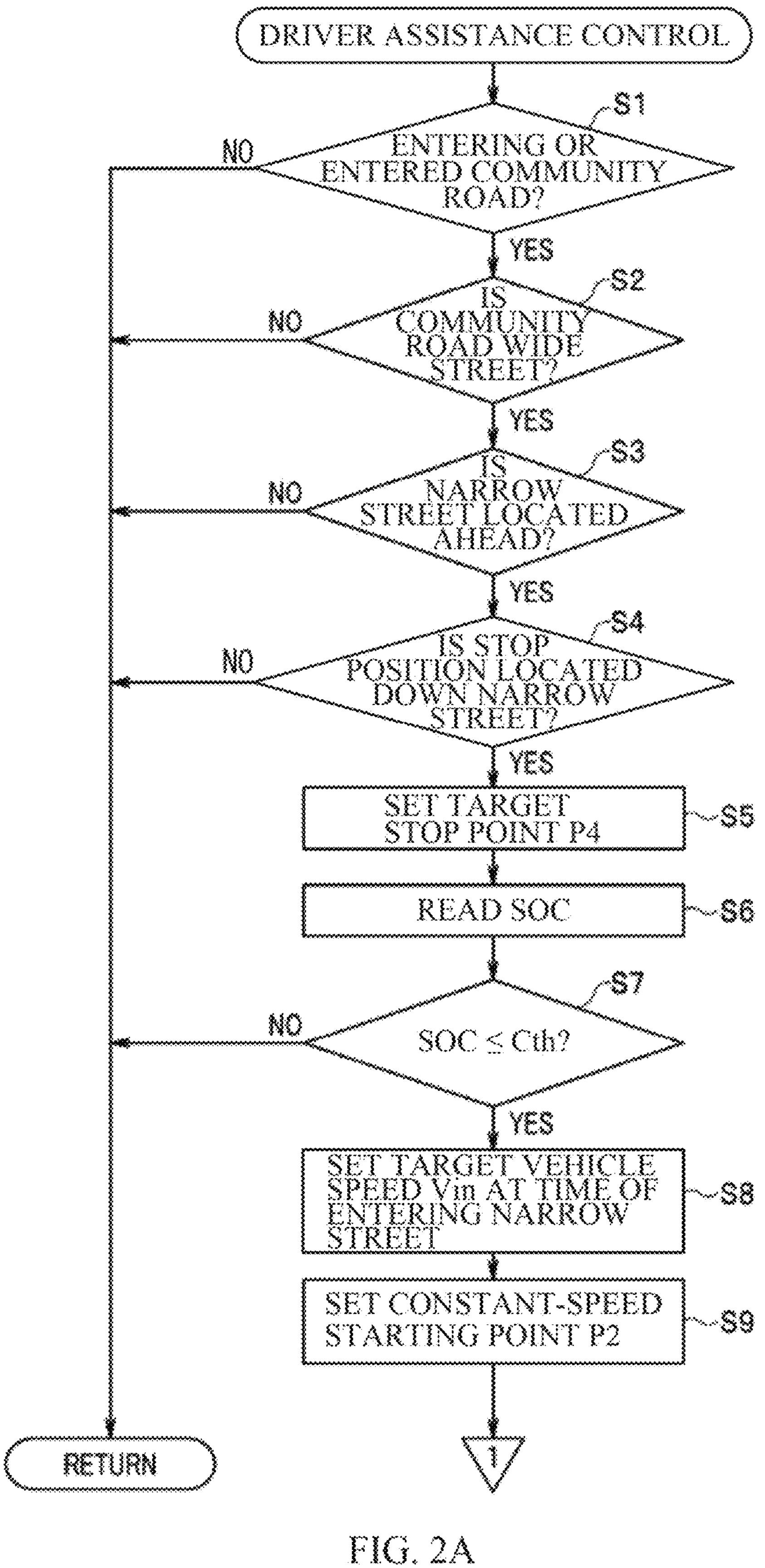
FIG. 2A is a flowchart illustrating an exemplary routine of driver assistance control performed by the driver assistance apparatus illustrated in FIG. 1.
Figure 2B:
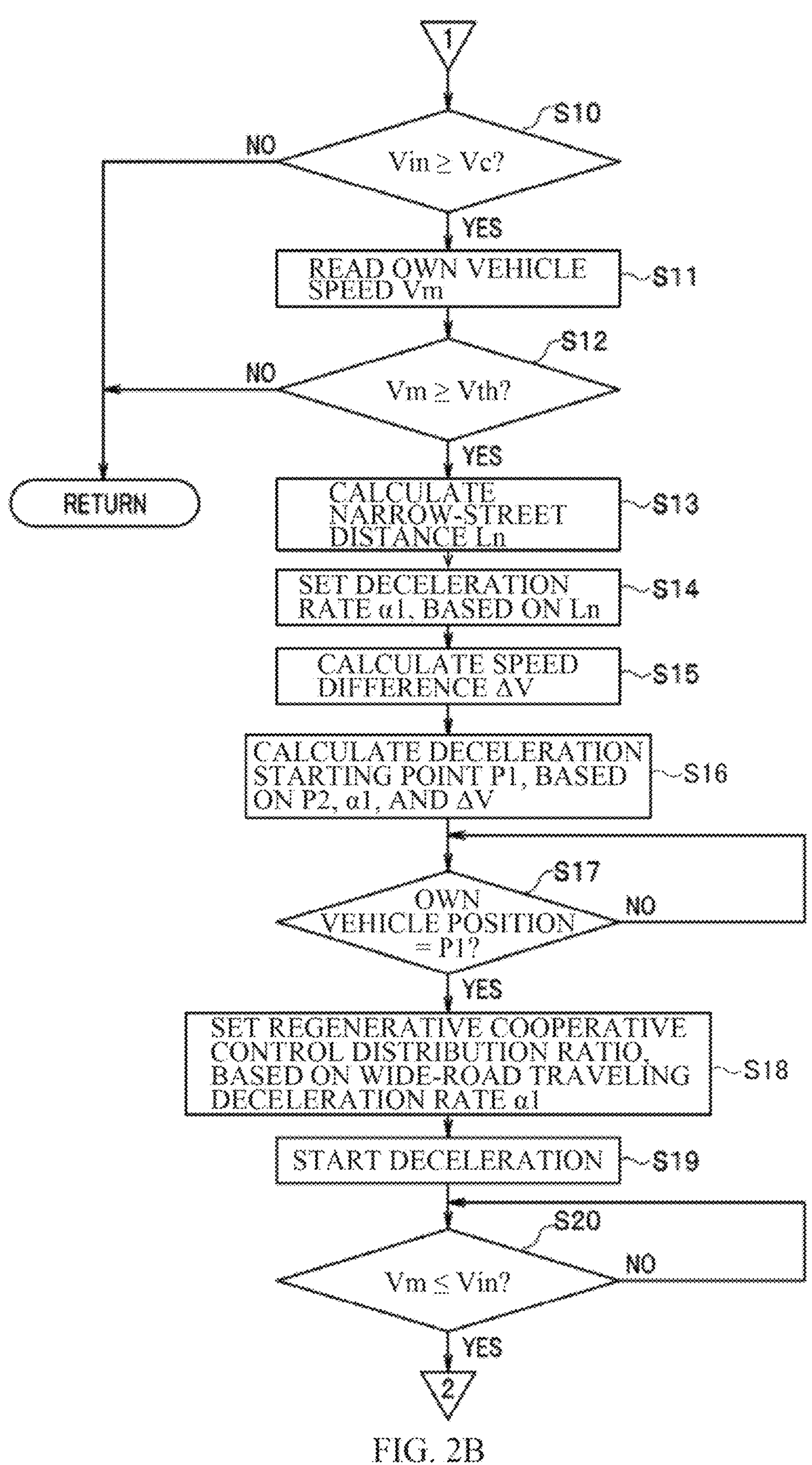
FIG. 2B is a flowchart illustrating an exemplary routine of the driver assistance control subsequent to the routine illustrated in FIG. 2A.
Figure 2C:
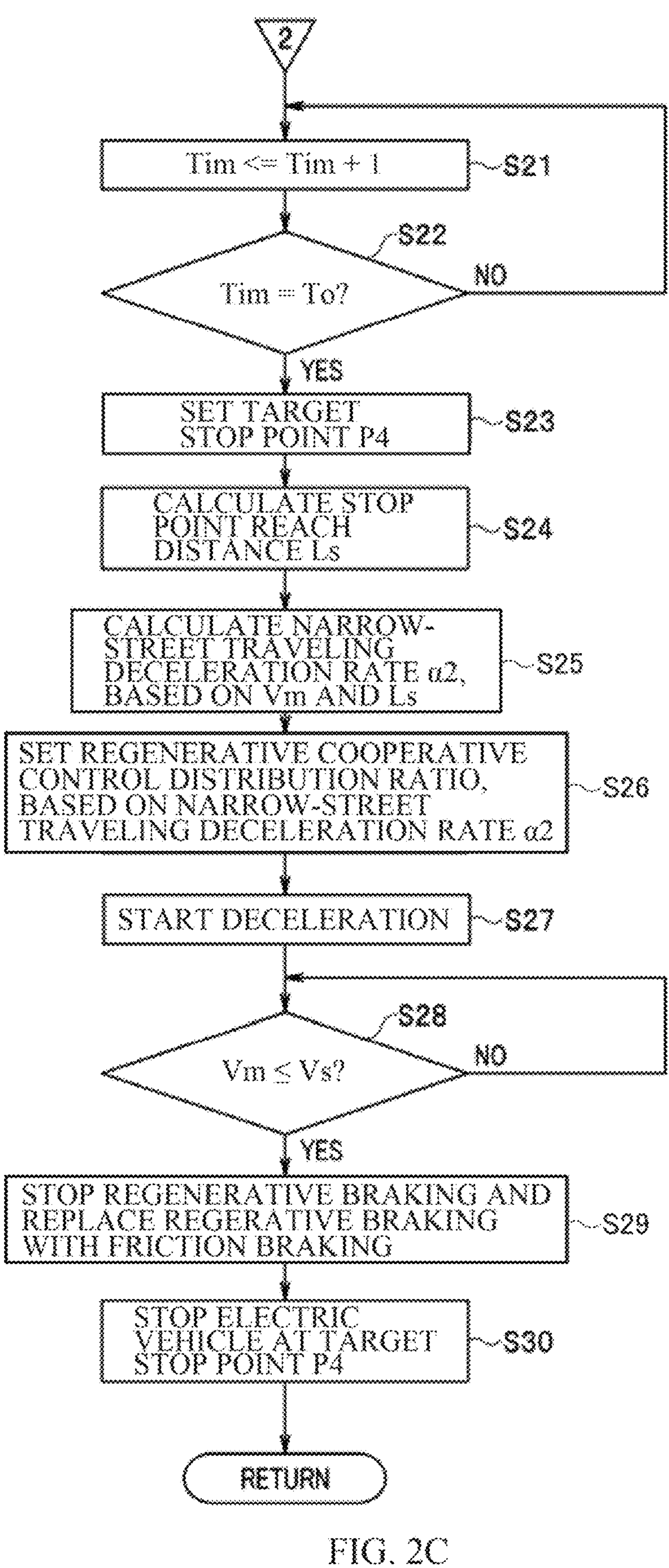
FIG. 2C is a flowchart illustrating an exemplary routine of the driver assistance control subsequent to the routine illustrated in FIG. 2B.

The control unit 21 may execute driver assistance control in accordance with an exemplary routine of the driver assistance control illustrated in FIGS. 2A to 2C.

In some embodiments, the control unit 21 may execute a process of acquiring the travel environment data on a travel route of the electric vehicle M in parallel to the routine of the driver assistance control in each predetermined calculation period. The travel environment data may be acquired based on the own vehicle position on the road map estimated by the map locator unit 23 or the image of the travel environment ahead of the own vehicle captured by the camera unit 22.

Upon starting the routine of the driver assistance control, the control unit 21 may first determine whether the electric vehicle M is attempting to enter the community road from an arterial road or whether the electric vehicle M has entered the community road from the arterial road, based on the travel environment data on the travel route of the electric vehicle M (step S1). The term "community road" used herein may refer to a road having no centerline and located in a residential area off the arterial road.

Figure 6:
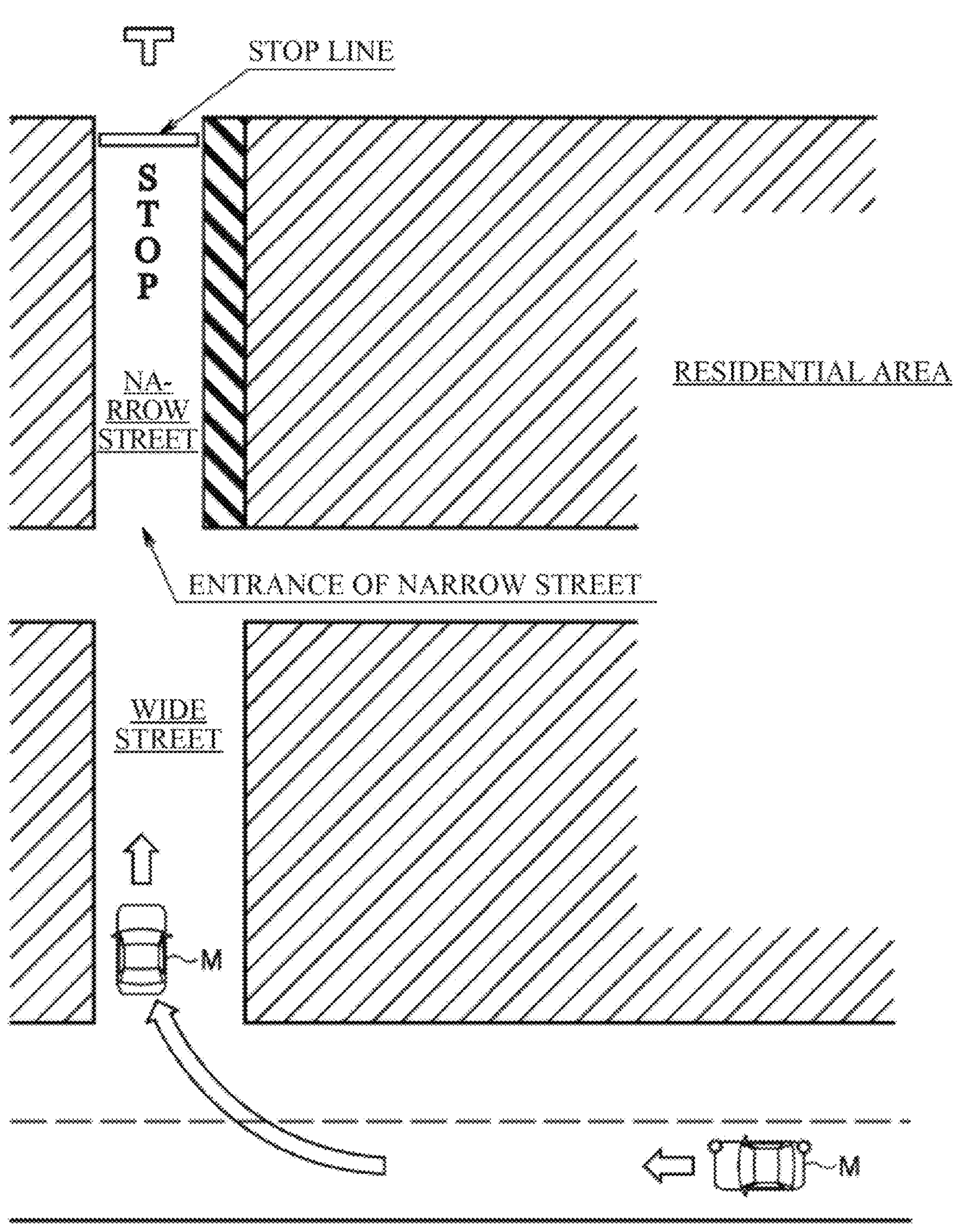
FIG. 6 is an overhead view of the electric vehicle illustrated in FIG. 1 in traveling on the community road.

For example, when the electric vehicle M on the arterial road makes right turn signals blinking as illustrated in FIG. 6, the control unit 21 may determine whether a road that the electric vehicle M is to enter after turning right is the community road defined above, based on the travel environment data on the travel route of the own vehicle. Further, the control unit 21 may also determine whether a road that the electric vehicle M has entered after turning right is the community road, based on the travel environment data on the travel route of the own vehicle.

If determining that the road that the electric vehicle M is to enter or the road that the electric vehicle M has entered is not the community road (step S1: NO), the control unit 21 may cause the flow to exit the routine. If determining that the road that the electric vehicle M is to enter or the road that the electric vehicle M has entered is the community road (step S1: YES), the control unit 21 may determine whether the community road is a wide street (step S2). In some embodiments, whether the community road is a wide street may be determined based on the travel environment data on the travel route of the own vehicle. The term "wide street" used herein may refer to a community road having a width large enough for two-way traffic, or a community road not having a width large enough for the two-way traffic but having a certain margin width of, for example 80 cm or greater, on each of the left side and the right side of the electric vehicle M, as illustrated in FIG. 6.

Figure 7:
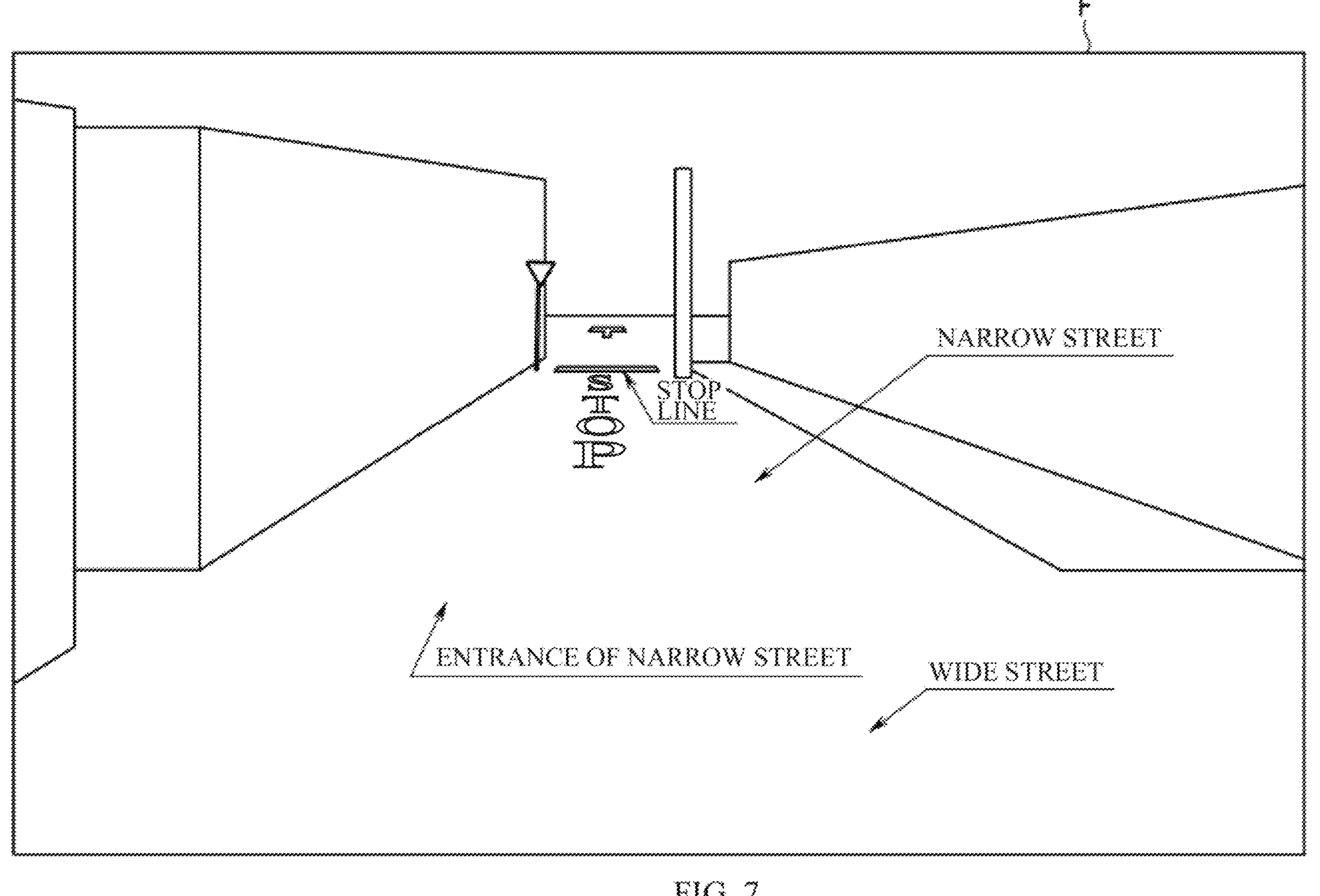
FIG. 7 illustrates an image captured by a camera of the electric vehicle illustrated in FIG. 1 when the electric vehicle enters the narrow street from the wide street of the community road.

If determining that the community road is not a wide street (step S2: NO), the control unit 21 may cause the flow to exit the routine. If determining that the community road is a wide street (step S2: YES), the control unit 21 determines whether a narrow street is located ahead of the wide street (step S3). In some embodiments, whether the narrow street is located ahead of the wide street may be determined based on the travel environment data on the travel route of the own vehicle. The term "narrow street" used herein may refer to a community road having a width larger than a vehicle width of the electric vehicle M but not large enough for the two-way traffic, as illustrated in FIGS. 6 and 7. Note that the processes in steps S1 to S3 may correspond to a process performed by a road detector according to one embodiment of the disclosure.

If determining that the narrow street is not located ahead of the wide street (step S3: NO), the control unit 21 may cause the flow to exit the routine. If determining that the narrow street is located ahead of the wide street (step S3: YES), the control unit 21 may determine whether a stop position is located down the narrow street (step S4). In some embodiments, whether the stop position is located down the narrow street may be determined by referring to static data indicating the stop position stored as the road map data in the road map database. In some embodiments, whether the stop position is located down the narrow street may be determined by recognizing a stop line on the narrow street, such as one illustrated in FIGS. 6 and 7, in the image of the travel environment. Note that the process in step S4 may correspond to a process performed by a stop position detector according to one embodiment of the disclosure.

If determining that the stop position has not been detected down the narrow street (step S4: NO), the control unit 21 may cause the flow to exit the routine. If determining that the stop position has been detected down the narrow street (step S4: YES), the control unit 21 may set the target stop point P4 immediately before the stop position (step S5). The target stop point P4 may be a position with which an anterior most part of the electric vehicle M is aligned when the electric vehicle M is stopped.

Thereafter, the control unit 21 may read the SOC of the battery 6 detected by the SOC sensor 25 (step S6). Thereafter, the control unit 21 may compare the battery SOC with a charge rate determination threshold Cth (step S7). In the present example embodiment, the comparison may be made to secure the battery SOC sufficient to start the electric vehicle M after stopping the electric vehicle M at the stop position. One reason for this is that the electric vehicle M consumes a large amount of the electric power of the battery 6 when being started from the stopped state.

The charge rate determination threshold Cth may be set to a battery SOC sufficient to start the electric vehicle M from the stopped state. When the electric vehicle M has a difficulty in starting with the current SOC of the battery 6, the control unit 21 may start the engine 8 of the range extender to thereby operate the GEN 7 to generate electric power, and supply the generated electric power to the battery 6.

If the SOC of the battery 6 is greater than the charge rate determination threshold Cth (SOC>Cth) (step S7: NO), the control unit 21 may determine that the battery SOC is sufficiently high and cause the flow to exit the routine. If the SOC of the battery 6 is less than or equal to the charge rate determination threshold Cth (SOC≤Cth) (step S7: YES), the control unit 21 may set a target vehicle speed Vin at the time of entering the narrow street (i.e., a narrow-street entry target vehicle speed Vin) (step S8). Note that the process in step S8 may correspond to a process performed by an entry target vehicle speed setter according to one embodiment of the disclosure.

The narrow-street entry target vehicle speed Vin may be set by reading a vehicle speed limit set for the narrow street from the road map data of the road map database. In some embodiments, the narrow-street entry target vehicle speed Vin may be set based on the vehicle speed limit indicated by a road sign recognized in the image of the travel environment ahead of the own vehicle captured by the camera unit 22. In some embodiments, the narrow-street entry target vehicle speed Vin may be set based on the width of the narrow street recognized in the image of the travel environment ahead of the own vehicle captured by the camera unit 22. When being set based on the width of the narrow street, the narrow-street entry target vehicle speed Vin may be set by referring to predetermined data such as a table indicating a determined relationship between the narrow-street entry target vehicle speed Vin and the width of the narrow street.

Figure 5:
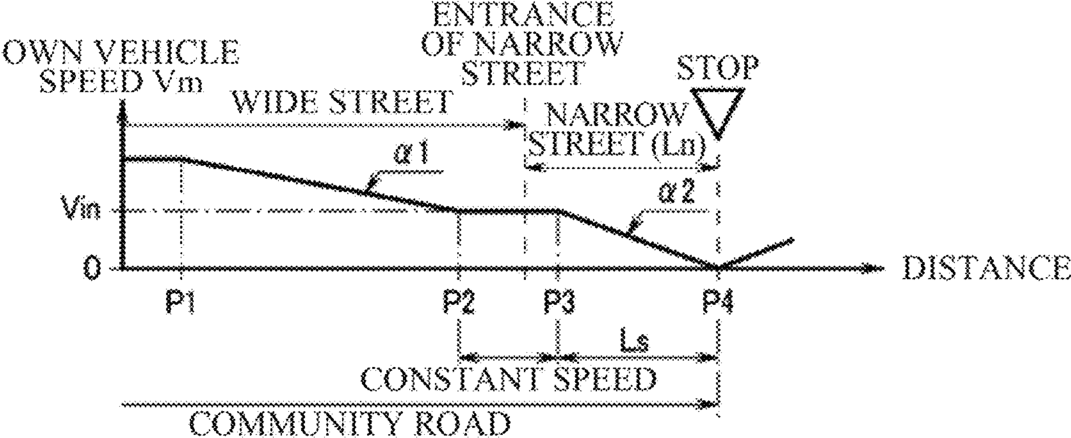
FIG. 5 is an explanatory diagram illustrating an exemplary vehicle speed control state of the electric vehicle illustrated in FIG. 1 in traveling from a wide street to a narrow street of a community road.

Thereafter, the control unit 21 may set the constant-speed starting point P2 at a predetermined position before an entrance of the narrow street, as illustrated in FIG. 5 (step S9). In some embodiment, the constant-speed starting point P2 may be set at a position two to five meters before the narrow street.

Thereafter, the control unit 21 may compare the narrow-street entry target vehicle speed Vin with a regeneration performable vehicle speed Vc (step S10). The regeneration performable vehicle speed Ve may be a threshold usable for determination as to whether regeneration or regenerative electric power generation by each of the FM/G 1 and the RM/G 2 is performable during decelerating the electric vehicle M. In some embodiments, the regeneration performable vehicle speed Vc may be a fixed value, for example of 40 km/h, determined by a method such as an experiment.

If the narrow-street entry target vehicle speed Vin is less than the regeneration performable vehicle speed Vc (Vin<Vc) (step S10: NO), the control unit 21 may cause the flow to exit the routine. If the narrow-street entry target vehicle speed Vin is greater than or equal to the regeneration performable vehicle speed Vc (Vin≥Vc) (step S10: YES), the control unit 21 may determine that the regeneration is performable and read the own vehicle speed Vm detected by the vehicle speed sensor 24 (step S11). Thereafter, the control unit 21 may compare the own vehicle speed Vm with a wide-street traveling threshold vehicle speed Vth [km/h] (step S12). The wide-street traveling threshold vehicle speed Vth may be a value resulting from adding a regenerative braking performable vehicle speed in traveling of the electric vehicle M on the wide street to the narrow-street entry target vehicle speed Vn. In some embodiments, the regenerative braking performable vehicle speed may be a fixed value determined in advance by a method such as an experiment depending on the kind of the electric vehicle M.

If the own vehicle speed Vm is less than the wide-street traveling threshold vehicle speed Vth (Vm<Vth) (step S12: NO), the control unit 21 may determine that the regenerative braking is not performable and cause the flow to exit the routine. If the own vehicle speed Vm is greater than or equal to the wide-street traveling threshold vehicle speed Vth (Vm≥Vth) (step S12: YES), the control unit 21 may calculate a narrow-street distance Ln (step S13). The narrow-street distance Ln may be a distance from the entrance of the narrow street to the target stop point P4, determined based on the travel environment data on the travel route of the own vehicle.

Thereafter, the control unit 21 may set a wide-street traveling deceleration rate α1 [km/h$^2$], based on the narrow-street distance Ln (step S14). Note that the process in step S14 may correspond to a process performed by a wide-street traveling deceleration rate setter according to one embodiment of the disclosure.

Figure 3:
FIG. 3 is a conceptual diagram illustrating a wide-street traveling deceleration rate setting table according to one example embodiment of the disclosure.

The wide-street traveling deceleration rate α1 may be set by referring to a wide-street traveling deceleration rate setting table. FIG. 3 illustrates a concept of the wide-street traveling deceleration rate setting table. The wide-street traveling deceleration rate α1 may be set in proportion to the narrow-street distance Ln in such a manner that the wide-street traveling deceleration rate α1 takes a lower value (i.e., becomes a higher negative deceleration rate) as the narrow-street distance Ln is shorter. In some embodiments, the wide-street traveling deceleration rate α1 may be set to a lower value than a normal deceleration rate set for traveling on an ordinary road. In some embodiments, the wide-street traveling deceleration rate α1 may be calculated based on the narrow-street distance Ln using a linear equation having a predetermined slope.

Thereafter, the control unit 21 may calculate a speed difference ΔV between the own vehicle speed Vm and the narrow-street entry target vehicle speed Vin (step S15). Note that the process in step S15 may correspond to a process performed by a speed difference processor according to one embodiment of the disclosure.

Thereafter, the control unit 21 may calculate the deceleration starting point P1, based on the constant-speed starting point P2, the wide-street traveling deceleration rate α1, and the speed difference ΔV (step S16). The deceleration starting point P1 may be calculated backward based on the constant-speed starting point P2 where the electric vehicle M is to be brought into the narrow-street entry target vehicle speed Vin after being decelerated at the wide-street traveling deceleration rate α1 (see FIG. 5). Note that the process in step S16 may correspond to a process performed by a deceleration starting point setter according to one embodiment of the disclosure.

The wide-street traveling deceleration rate α1 may be set, based on the narrow-street distance Ln, to a lower value as the narrow-street distance Ln is shorter. Accordingly, when the speed difference ΔV is constant, as the narrow-street distance Ln is shorter, a distance from the deceleration starting point P1 to the constant-speed starting point P2 may be longer. In other words, the electric vehicle M may be decelerated at a lower wide-street traveling deceleration rate α1.

Thereafter, the control unit 21 may determine whether the current position of the electric vehicle M has reached the deceleration starting point P1 (step S17). In some embodiments, whether the current position of the electric vehicle M has reached the deceleration starting point P1 may be determined by comparing the own vehicle position on the road map estimated by the map locator unit 23 with the deceleration starting point P1 plotted on the road map. In some embodiments, whether the current position of the electric vehicle M has reached the deceleration starting point P1 may be determined based on a time period necessary for the electric vehicle M to reach the deceleration starting point P1 as well as the image of the travel environment ahead of the own vehicle captured by the camera unit 22.

Thereafter, the control unit 21 may stand by until the own vehicle position of the electric vehicle M reaches the deceleration starting point P1. If the own vehicle position of the electric vehicle M has reached the deceleration starting point P1 (step S17: YES), the control unit 21 may set braking torque that decelerates the electric vehicle M (step S18). The braking torque may be produced by cooperative control of the regenerative braking and the friction braking performed by the HCU 10. The control unit 21 may set a braking torque distribution ratio between the friction braking and the regenerative braking, based on the wide-street traveling deceleration rate α1 referring to a braking torque distribution ratio map.

Figure 4:
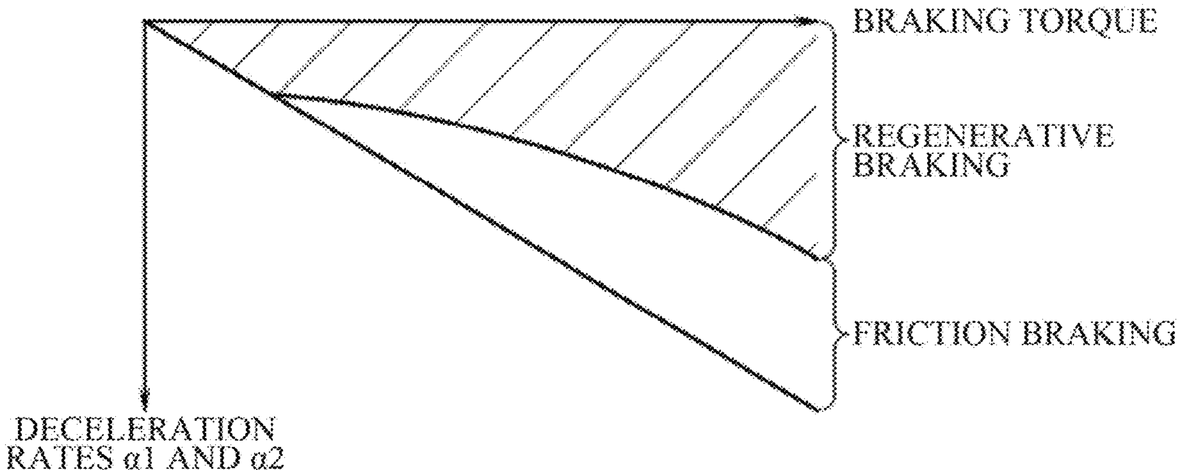
FIG. 4 is a conceptual diagram illustrating a braking torque distribution ratio map according to one example embodiment of the disclosure.

FIG. 4 illustrates a concept of the braking torque distribution ratio map. Referring to FIG. 4, the braking torque distribution ratio map may include braking torque set corresponding to each deceleration rate, such as the wide-street traveling deceleration rate α1 or a narrow-street traveling deceleration rate α2. The braking torque distribution ratio map may further include maximum regenerative braking torque set for each deceleration rate such as the wide-street traveling deceleration rate α1 or the narrow-street traveling deceleration rate α2. The braking torque distribution ratio map may further include a distribution ratio of friction braking based on which an insufficient amount of regenerative braking torque is to be compensated. In some embodiments, the regenerative braking torque for each deceleration rate such as the wide-street traveling deceleration rate α1 or the narrow-street traveling deceleration rate α2 may be determined and set in advance by a method such as an experiment. As illustrated in FIG. 4, the braking torque may be more difficult to compensate simply with the regenerative braking as the deceleration rate such as the wide-street traveling deceleration rate α1 or the narrow-street traveling deceleration rate α2 increases. To address this, the distribution ratio of the friction braking in the regenerative cooperative control may increase as the braking torque increases.

In other words, when traveling in a low-speed region such as the community road where no rapid deceleration is necessitated, the electric vehicle M is allowed to decelerate simply by the regenerative braking by decreasing the deceleration rate. Such a decrease in the deceleration rate helps to extend a travelable distance under the regenerative braking and prolong charging time accordingly. This results in efficient conversion of deceleration energy into regenerative electric power.

Thereafter, the control unit 21 may output a braking torque command corresponding to a necessary braking torque distribution ratio to each of the inverter 5 and the HCU 10. In accordance with the braking torque command, the control unit 21 may start to decelerate the electric vehicle M (step S19). Thereafter, the control unit 21 may stand by until the own vehicle speed Vm is decreased to the narrow-street entry target vehicle speed Vin (step S20). Note that the processes in steps S19 and S20 may correspond to a process performed by a deceleration processor according to one embodiment of the disclosure.

If the own vehicle speed Vm has reached the narrow-street entry target vehicle speed Vin (step S20: YES, see P2 in FIG. 5), the control unit 21 may terminate the braking of the electric vehicle M. After terminating the braking of the electric vehicle M, the control unit 21 may cause the electric vehicle M to travel at a constant speed while maintaining the own vehicle speed Vm at the narrow-street entry target vehicle speed Vin (i.e., Vm=Vin). Setting of the constant-speed starting point P2 serving as an end point of deceleration in traveling on the narrow street to a position before the entrance of the narrow street allows a constant-speed travel zone between the constant-speed starting point P2 and the constant-speed end point P3 to be set relatively long (see FIG. 5). This helps to provide a margin of time to shift from the deceleration in traveling on the wide street to the deceleration in traveling on the narrow street. Such a margin time helps to provide stable travelability to a driver who drives the electric vehicle M with less strangeness even when the deceleration rate is changed.

Thereafter, the control unit 21 may start to count a count value Tim of a timer (Tim<=Tim+1, step S21). In some embodiments, a default value of the count value Tim may be 0.

The control unit 21 may stand by until the count value Tim of the timer reaches a predetermined count value (a constant-speed end count value) To for a time period of, for example, 2 sec to 3 sec (step S22). If the count value Tim has reached the constant-speed end count value To (step S22: YES, Tim=To), the control unit 21 may set the target stop point P4 (step S23). Note that, as illustrated in FIG. 5, the constant-speed end point (deceleration starting point) P3 may be set at a position where the count value Tim of the timer has reached the constant-speed end count value To, and the target stop point P4 may be set before the stop line painted on and located down the narrow street. In some embodiments, the stop line may be detected based on the own vehicle position on the road map estimated by the map locator unit 23. In some embodiments, the stop line may be detected in the image of the travel environment ahead of the own vehicle captured by the camera unit 22.

Thereafter, the control unit 21 may calculate a stop-point reach distance Ls (step S24). The stop-point reach distance Ls may be a distance from the constant-speed end point P3 to the target stop point P4. In some embodiments, the stop-point reach distance Ls may be calculated based on a road distance between the constant-speed end point P3 and the target stop point P4 that are plotted on the road map of the map locator unit 23. In some embodiments, the stop-point reach distance Ls may be calculated based on a distance to the stop line detected in the image of the travel environment ahead of the own vehicle captured by the camera unit 22 at the constant-speed end point P3.

Thereafter, the control unit 21 may calculate the narrow-street traveling deceleration rate α2 (step S25). The narrow-street traveling deceleration rate α2 may be set to cause the electric vehicle M to be stopped at the target stop point P4 (i.e., Vm=0 km/h). In some embodiments, the narrow-street traveling deceleration rate α2 may be calculated based on the own vehicle speed Vm (=Vin) and the stop-point reach distance Ls (i.e., $\alpha 2=(-Vm^2/Ls)/2$).

Because the constant-speed starting point P2 is set before the entrance of the narrow street, the constant-speed end point P3 may be set adjacent to the entrance of the narrow street. This helps to secure a relatively long stop-point reach distance Ls and set the narrow-street traveling deceleration rate α2 to a low value accordingly.

Thereafter, the control unit 21 may set a regenerative cooperative control distribution ratio (step S26). The regenerative cooperative control distribution ratio may be set to compensate an insufficient amount of the regenerative braking torque with the friction braking torque. The regenerative cooperative control distribution ratio may be set by referring to the braking torque distribution ratio map illustrated in FIG. 4. Note that characteristics of the braking torque distribution ratio map has been described above and thus will not be described in detail below.

Thereafter, the control unit 21 may output a braking torque command corresponding to a necessary braking torque distribution ratio to each of the inverter 5 and the HCU 10. In accordance with the braking torque command, the control unit 21 may start to decelerate the electric vehicle M (step S27). Thereafter, the control unit 21 may stand by until the own vehicle speed Vm is decreased to a pre-stop vehicle speed Vs of, for example, 5 km/s (step S28). If the own vehicle speed Vm has reached the pre-stop vehicle speed Vs (step S28: YES), the control unit 21 may cause the flow to proceed to step S29. Note that the processes in steps S27 and S28 may correspond to a process performed by the deceleration processor according to one embodiment of the disclosure.

In step S29, the control unit 21 may stop the regenerative braking performed by each of the FM/G 1 and the RM/G 2 and simultaneously replace the regenerative braking with the friction braking performed by the HCU 10. Thereafter, the control unit 21 may stop the electric vehicle M at the target stop point P4 (see FIG. 5) by the friction braking performed by the HCU 10 (step S30) and then end the routine.

According to the example embodiment described above, the control unit 21 may individually set the wide-street traveling deceleration rate α1 and the narrow-street traveling deceleration rate α2 for the electric vehicle M traveling with a low SOC under the automated driving control or the ACC to enter the narrow street from the wide street and to stop at the stop line set down the narrow street.

In some embodiments, the wide-street traveling deceleration rate α1 may be set to a lower value than the normal deceleration rate set for traveling on the ordinary road and to a lower value as the narrow-street distance Ln is shorter. Further, the narrow-street traveling deceleration rate α2 may be calculated based on the narrow-street entry target vehicle speed Vin and the stop-point reach distance Ls.

In some embodiments, the braking torque may be set based on the wide-street traveling deceleration rate $\alpha 1$ and the narrow-street traveling deceleration rate $\alpha 2$ referring to the braking torque distribution ratio map. Further, the maximum regenerative braking torque to be produced by the regenerative braking by each of the FM/G 1 and the RM/G 2 may be set referring to the braking torque distribution ratio map, and an insufficient amount of the regenerative braking torque may be compensated with the friction braking torque.

As is evident from the characteristics of the braking torque distribution ratio map illustrated in FIG. 4, the electric vehicle M is allowed to decelerate simply by the regenerative braking by decreasing the deceleration rate in the low-speed region such as the community road. Such a decrease in the deceleration rate helps to extend the travelable distance under the regenerative braking and prolong the charging time accordingly.

In other words, the wide-street traveling deceleration rate $\alpha 1$ may be set, based on the narrow-street distance Ln, to a lower value as the narrow-street distance Ln is shorter. The distance from the deceleration starting point P1 to the constant-speed starting point P2 may be set longer as the narrow-street distance Ln is shorter. This allows the electric vehicle M to decelerate simply by the regenerative braking, resulting in sufficient charging prior to entering the narrow road.

Such a configuration enables efficient conversion of the deceleration energy produced during deceleration traveling of the electric vehicle M on the community road into regenerative electric power to thereby charge the battery 6. This results in improvement in specific power consumption. This configuration further helps to decrease frequency of starting up the engine 8 of the range extender EV to thereby improve fuel economy. Further, slow deceleration of the electric vehicle M helps to make the driver feel less strange. Furthermore, sufficient charging performed at the time of entering the narrow street helps to eliminate an insufficient SOC that may otherwise affect the electric vehicle M in being started from the target stop point P4.

In addition, when the electric vehicle M is to enter the narrow street from the wide street, setting of the constant-speed starting point P2 before the entrance of the narrow street allows the deceleration starting point P3 of the narrow street to be set adjacent to the entrance of the narrow street. Such a configuration helps to set the stop-point reach distance Ls to a long distance and decrease the narrow-street traveling deceleration rate $\alpha 2$ accordingly. This allows the electric vehicle M to decelerate simply by the regenerative braking also during traveling on the narrow street, and allows the battery 6 to be charged with the regenerative electric power.

Although the disclosure has been described hereinabove in terms of the example embodiment, the disclosure is not limited thereto. In some embodiments, the electric vehicle M may be any vehicle such as a hybrid vehicle including a combination of a motor generator (M/G) and an engine each serving as a drive source. In some embodiments, the stop line may include, without limitation, a stop line located before a railroad crossing.

It should be appreciated that variations may be made in the described example embodiment and modification examples by those skilled in the art without departing from the scope of the disclosure as defined by the following claims.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a", "an", and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "substantially", "approximately", "about", and its variants having the similar meaning thereto are defined as being largely but not necessarily wholly what is specified as understood by one of ordinary skill in the art.

The term "disposed on/provided on/formed on" and its variants having the similar meaning thereto as used herein refer to elements disposed directly in contact with each other or indirectly by having intervening structures therebetween.

The control unit 21 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control unit 21. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control unit 21 illustrated in FIG. 1.

The invention claimed is:

1. A driver assistance apparatus for an electric vehicle, the driver assistance apparatus comprising:

a battery;

a motor generator configured to drive the electric vehicle with electric power supplied from the battery and to charge the battery with electric power generated by regenerative braking upon decelerating the electric vehicle;

a vehicle speed sensor configured to detect an own vehicle speed of the electric vehicle;

a processor; and a memory storing executable instructions that cause the processor to:

acquire travel environment data on a travel route of the electric vehicle;

control a vehicle speed and a deceleration rate of the electric vehicle based on the own vehicle speed and the travel environment data by causing the motor generator to drive the electric vehicle or to perform the regenerative braking; and determine whether a narrowed portion of the travel route is detected based on the travel environment data while the electric vehicle is traveling on a wide portion of the travel route, the wide portion being a portion of the travel route that is wide enough to allow two-way traffic and the narrowed portion being a portion of the travel route that continues from the wide portion and is not wide enough to allow two-way traffic, wherein, in response to determining that the narrow portion is detected, the processor then determines whether the narrowed portion of the travel route includes a stop position based on the travel environment data, determines a target vehicle speed for entering the narrowed portion based on the travel environment data corresponding to the narrow portion in response to determining that the narrowed portion includes the stop position, determines a first deceleration rate at which the own vehicle speed is decreased per unit time, the first deceleration rate increasing as a section distance becomes shorter, the section distance being a distance between a first point, at which the narrowed portion of the travel route starts, and the stop position, and executes a deceleration control to control the motor generator to decelerate the electric vehicle at the first deceleration rate to the target vehicle speed using only the regenerative braking so that the own vehicle speed becomes equal to the target vehicle speed when the electric vehicle reaches a second point located a predetermined distance greater than zero upstream of the first point.

2. The driver assistance apparatus according to claim 1, further comprising:

a state-of-charge sensor configured to detect a state of charge of the battery, wherein the executable instructions further cause the processor to:

determine whether the state of charge detected by the state-of-charge sensor is less than or equal to a threshold state of charge in response to determining that the narrowed portion and the stop position are detected;

execute the deceleration control in response to determining that the state of charge is less than or equal to the threshold state of charge and determining that the own vehicle speed is greater than the target vehicle speed;

skip the deceleration control regardless of whether the own vehicle speed is greater than the target vehicle speed in response to determining that the state of charge is greater than the threshold state of charge, wherein the processor determines the first deceleration value such that regenerative braking is continuously performable while executing the deceleration control; and sets the threshold state of charge to a value sufficient to start the electric vehicle from a stopped state.

3. The driver assistance apparatus according to claim 1, wherein the executable instructions further cause the processor to:

after starting the deceleration control, in response to detection that the own vehicle speed is less than or equal to the target vehicle speed, stop the deceleration control and execute constant-speed travel control to control the motor generator such that the electric vehicle travels at the target vehicle speed; and after the electric vehicle has passed the first point, terminate the constant-speed travel control and execute stop control to control the motor generator such that the electric vehicle decelerates at a second deceleration rate and stops at the stop position.

4. The driver assistance apparatus according to claim 3, wherein the executable instructions further cause the processor to:

execute the constant-speed travel control for a predetermined time period; and start execution of the stop control from a time when the constant-speed travel control is terminated.

5. The driver assistance apparatus according to claim 4, wherein the executable instructions further cause the processor to:

when the electric vehicle is traveling on the wide portion, determine whether the wide portion is located in a residential area off an arterial road;

in response to determining that the wide portion is located in the residential area off the arterial road, execute a determination as to whether the narrowed portion continuing from the wide portion on the travel route of the electric vehicle and a stop position beyond the narrowed portion on the travel route of the electric vehicle have been detected; and in response to determining that the wide portion is not located in the residential area off the arterial road, skip the determination as to whether the narrowed portion and the stop position have been detected.

6. The driver assistance apparatus according to claim 5, wherein:

the wide portion and the narrowed portion of the travel route have no centerline.

* * * * *